United States Patent [19]
Gunderson et al.

[11] Patent Number: 5,160,622
[45] Date of Patent: Nov. 3, 1992

[54] METHOD FOR FILTERING AQUARIUM WATER

[76] Inventors: Dennis E. Gunderson, 5379 Temple Ct., Madison, Wis. 53705; Eric G. Gunderson, 4033 Lori Cir., Madison, Wis. 53714

[21] Appl. No.: 595,623

[22] Filed: Oct. 9, 1990

Related U.S. Application Data

[63] Continuation of Ser. No. 274,441, Nov. 17, 1988, abandoned.

[51] Int. Cl.$^5$ .................................................. C02F 3/06
[52] U.S. Cl. ...................................... 210/617; 210/169
[58] Field of Search ............... 210/617, 618, 169, 150, 210/151

[56] References Cited

U.S. PATENT DOCUMENTS

| | | | |
|---|---|---|---|
| 895,229 | 8/1908 | Beddoes | 210/617 |
| 3,187,892 | 6/1965 | Pall et al. | 210/123 |
| 3,260,366 | 7/1966 | Duff et al. | 210/140 |
| 3,502,212 | 3/1970 | Veda | 210/98 |
| 3,620,371 | 11/1979 | Valdespino | 210/140 |
| 3,669,297 | 6/1972 | Willinger | 210/169 |
| 4,009,099 | 2/1977 | Jeris | 210/618 |
| 4,035,299 | 7/1977 | Vroeginday | 210/169 |
| 4,036,756 | 7/1977 | Dockery | 210/169 |
| 4,141,824 | 2/1979 | Smith | 210/618 |
| 4,265,751 | 5/1981 | Willinger | 210/169 |
| 4,684,462 | 8/1987 | Augustyniak | 210/169 |
| 4,687,575 | 8/1987 | Grose | 210/169 |
| 4,761,227 | 8/1988 | Willinger et al. | 210/169 |
| 4,894,149 | 1/1990 | Block | 210/169 |

Primary Examiner—Thomas Wyse
Attorney, Agent, or Firm—James A. Wong

[57] ABSTRACT

The present invention is directed to a filtering system and method of filtering an aqueous medium, such as water in an aquarium tank. The aquarium water is brought into contact with a filtering medium, preferably a biological filtering medium. The filtering medium purifies the aquarium water by removing impurities from the aquarium water. At a certain time, the water is rapidly removed from the filtering medium, preferably by siphoning action. The process and system provides the biological filtering medium with exposure to air necessary to sustain the life and activity of the bacteria growing on the biological medium. At the same time, the system purifies the aquarium water.

7 Claims, 8 Drawing Sheets

METHOD FOR FILTERING AQUARIUM WATER

This is a continuation of co-pending application Ser. No. 274,441 filed on 11/17/88, now abandoned.

FIELD OF THE INVENTION

The present invention is directed to a method and apparatus for filtering an aqueous medium, and is specifically directed to a method and apparatus for the filtration and purification of water in fresh water and salt water aquariums. Preferably, the present invention is directed to a method and apparatus for the bacterial cleansing of aquarium water and for sustaining bacterial life in a biological filter medium

DESCRIPTION OF PRIOR ART

Most aquariums are closed habitats and are subject to biological waste pollution. As such, the water in the aquarium tank must be periodically cleaned, aerated and degassed in order to replenish the oxygen content of the tank water.

There are generally three types of aquarium water filtration devices: (1) mechanical filtration, which removes suspended solid material from the water; (2) chemical filtration, which removes dyes and other colorants as well as certain inorganic substances; and (3) biological filtration, which removes certain organic waste products by means of naturally occurring living bacteria attached to a filter material. The biological filtration process is the most effective if a large surface area for bacteria attachment is provided in the filter.

Typically, aquarium filtration devices include a housing containing a filter material through which the contaminated aquarium water passes into a clean water chamber. A siphon is generally utilized for extracting the contaminated water from the aquarium tank and supplying it to the filter. The clean water is then either pumped or air-lifted back into the aquarium tank thereby providing a continuous flow of water through the aquarium filtration device and providing both clean water to the aquarium tank as well as providing the necessary aeration needed into the tank.

Presently, there are two basic methods for passing aquarium water through a filter medium and exposing the medium to air. First, the water may be cleaned by means of a moving filter which is dipped into and removed from the aquarium water. For example, the filter may be configured as a wheel rotating on an axle through its center. The axle is positioned horizontally across the filter tank so that, as the wheel turns, each portion of the filter is cyclically immersed into and then withdrawn from the aquarium water. The desired effect of full immersion and subsequent exposure to air is achieved, but the rotation of the filter involves an undesirable degree of mechanical complexity and the potential for malfunction. Further, if the wheel stops for any reason, an entire portion of the filter is inactivated.

A second method for exposing a filter to aquarium water is by sprinkling aquarium water over a stationary filter media. In this manner, water is distributed by a stationary spray bar or drip plate. The filter is exposed to aquarium water and air in a random fashion by dripping or sprinkling the water onto the filter medium. The actual coverage of the filter tends to be uncertain and the multiplicity of small holes through which water is dripped or sprayed can easily be plugged with algae or other waste products.

An offshoot of the sprinkler-type filter process is a process for distributing aquarium water over a filter by means of a rotating spray bar. However, the mechanism of the spray bar motion is a source of both mechanical complexity and poor reliability. For example, if the spray bar "stalls", a majority of the media volume becomes inactive.

Examples of prior art aquarium filters include U.S. Pat. No. 4,684,462 to Augustyniak, which is directed to a water filtration system for an aquarium. The filter uses a siphon tube to transfer water from the aquarium through a filtering system below the aquarium and to a water storage tank below the filtering system. The water in the storage tank is then pumped back to the aquarium completing the cycle. If the water exceeds a predetermined level, it is siphoned through a filtering system to a storage tank. Water is then driven from the storage tank to the aquarium by an electrically driven water pump.

U.S. Pat. No. 4,265,751 to Willinger is directed to an aquarium filter device having a filter receptacle which includes a filter chamber for receiving contaminated aquarium water and a clean water chamber. The two chambers are separated by a filter bed. The means for supplying the contaminated water to the filter chamber includes a siphon tube which provides a siphoned flow of water from the aquarium tank. The water is filtered and returned to the aquarium by means of an aquarium air pump which supplies compressed air into the return tube.

U.S. Pat. No. 4,036,756 to Dockery is directed to an aquarium filter assembly which includes a siphon housing assembly and a filter holding tank. The siphon housing supports a pump which draws water from the aquarium through the siphon housing to the filter holding tank. The filter holding tank includes an overflow return area for returning the filtered water to the aquarium.

U.S. Pat. No. 4,035,299 to Vroeginday is directed to a method for initiating a flow between the aquarium in a filter tank within a siphon tube. The apparatus includes a siphon tube connected between the aquarium tank and the filter tank. The siphon tube is associated with a siphon bulb which, when squeezed, exhausts air through the tube and out the aquarium tank. When the bulb is released, the pressure differential causes the air within the tube to be drawn into the bulb. The removal of the air within the siphoned tube causes the fluid to fill the siphon tube and initiates the siphoning action.

U.S. Pat. No. 4,687,575 to Grose is directed to an aquarium filtering system which includes a series of tubes within the aquarium which draw water through a conventional under-gravel filtration system by pouring the water onto the filter. The filter water is then returned to the aquarium by means of a pump.

U.S. Pat. No. 3,669,297 to Willinger is directed to an automatic siphoning filtration device having a filter receptacle, which includes a siphon, filtering materials and a pump to recirculate the aquarium water. The siphon is provided with a tube having an end submerged in the aquarium water. The siphoning action is started when water within the filter receptacle is removed from the siphon compartment.

One of the major deficiencies with prior art aquarium filters is the debris or detritus which becomes lodged in the filter medium during the filter process. When the debris becomes lodged in the filter medium, the effectiveness of the filter medium is diminished. If the medium involves a biological filter, wherein useful bacteria are present, the food and oxygen necessary to sustain bacteria life may no longer reach the bacteria, which may inhibit and even kill the useful bacteria. This is a problem especially with existing biological filters which attempt to culture desirable filtering bacteria by providing a one-way water movement over a bacterial filter medium.

SUMMARY OF THE INVENTION

It is therefore an object of the present invention to provide a method and apparatus which alternately floods and drains a stationary biological filter media to access both water and air to the biological media for biological filter systems.

This and other objects are provided by an aqueous filtering system comprising a filter tank containing a filtering medium. The filter tank includes a means to fill the filter tank with an aqueous medium thereby associating the aqueous medium with the filter medium. A siphoning means is present to drain the aqueous medium from the filter tank. In this manner, the aqueous medium is alternately filled and drained from the filter tank. Further, there is a means to terminate the draining of the aqueous medium from the filter tank thereby initiating the refilling of the filter tank.

The present invention is also directed to an aquarium comprising an aquarium tank adapted to hold aquarium water and aquatic life forms, and a filtering system. The filtering system comprises a filter tank containing a filter medium, a means to transport the aquarium water to the filter tank wherein the aquarium water is associated with the filter medium, and a siphon to drain the aquarium water from the filter tank. The aquarium water is alternately filled and drained from the filter tank in such a manner that the aquarium water is drained from the filter tank at a faster rate than it is filled. The filtering system also includes a siphon break tube in association with the siphon. The siphon break tube effects a rapid termination of the action of the siphon when the aquarium water in the filter tank reaches a selected level. The termination of the action of the siphon initiates the refilling of the filter tank.

Although the filtering system of the present invention is specifically directed to a biological filtering system, for purposes of the present invention it can also include nonbiological filtering systems which employ the flood/drain system of the present invention.

Advantageously, the system of the present invention overcomes the channeling and clogging problems inherent with the prior art disclosures as well as the fragmented filter performance in existing systems. These advantages are due to the multidirectional water flow of the present invention, in which water is forced up through the filter media during the filling cycle, thus dislodging debris that may have become lodged during the previous draining cycle. The debris is then pulled further downward into the filtering system during the draining process.

With each cycle of the fill/drain process, water and oxygen are brought to all parts of the filter media, allowing total utilization of the entire surface area of the filter media by the useful bacteria. Thus, the efficiency of the filtering process by the use of the apparatus of the present invention is greatly enhanced.

The filter system of the present invention also provides for the efficient use of space and filter media without moving parts and without the necessity of small spray holes which tend to become plugged in spray systems. By the absence of moving parts in one of the embodiments, the filter system of the present invention is not readily susceptible to mechanical failure.

The filter system of the present invention also provides a bacterial culturing capacity far exceeding other known filter systems. With the unique fill/drain cycle of the present invention, the filter apparatus is designed to bring aquarium water in contact with the filter medium on which the desired bacteria grows. Then, by removing the water during the draining cycle, the bacteria is provided with the needed exposure to air. The filter system therefore provides for a symbiotic relationship in which the aquarium water is purified by bacteria which are in turn provided with a cyclic exposure to water, containing life-sustaining nutrients, and air.

Further, the filter system is advantageously separated from the aquarium tank, thus providing a system which is easy to remove if necessary.

Further objects, features and advantages of the invention will be apparent from the following detailed description when taken in conjunction with the accompanying drawings.

DETAILED DESCRIPTION OF THE INVENTION

Referring now to the drawings, wherein like reference characters represent like elements throughout the various views, reference numeral 10 is used to designate the aquarium structure in its entirety. The aquarium structure 10 includes an aquarium tank 12 and an external filter assembly 14. The aquarium tank 12 and the external filter assembly 14 may be supported on a suitable stand 15.

Aquarium Tank

The tank 12 is conventional in every respect and, as such, is made of transparent material such as glass. The tank 12 is provided with water 16 as well as marine, i.e., saltwater, or freshwater organisms and plant life in a customary manner.

Filter Assembly

The filter system 14 is designed for the use of stationary filter media, which preferably is the host for desired bacteria. The system 14 is alternately flooded with aquarium water 16 and fully exposed to air. The result is an efficient and consistent delivery of required air and water to the bacteria to provide for the effective treatment by bacteria and a filtered or purified water to be redirected to the aquarium.

Figure 1:
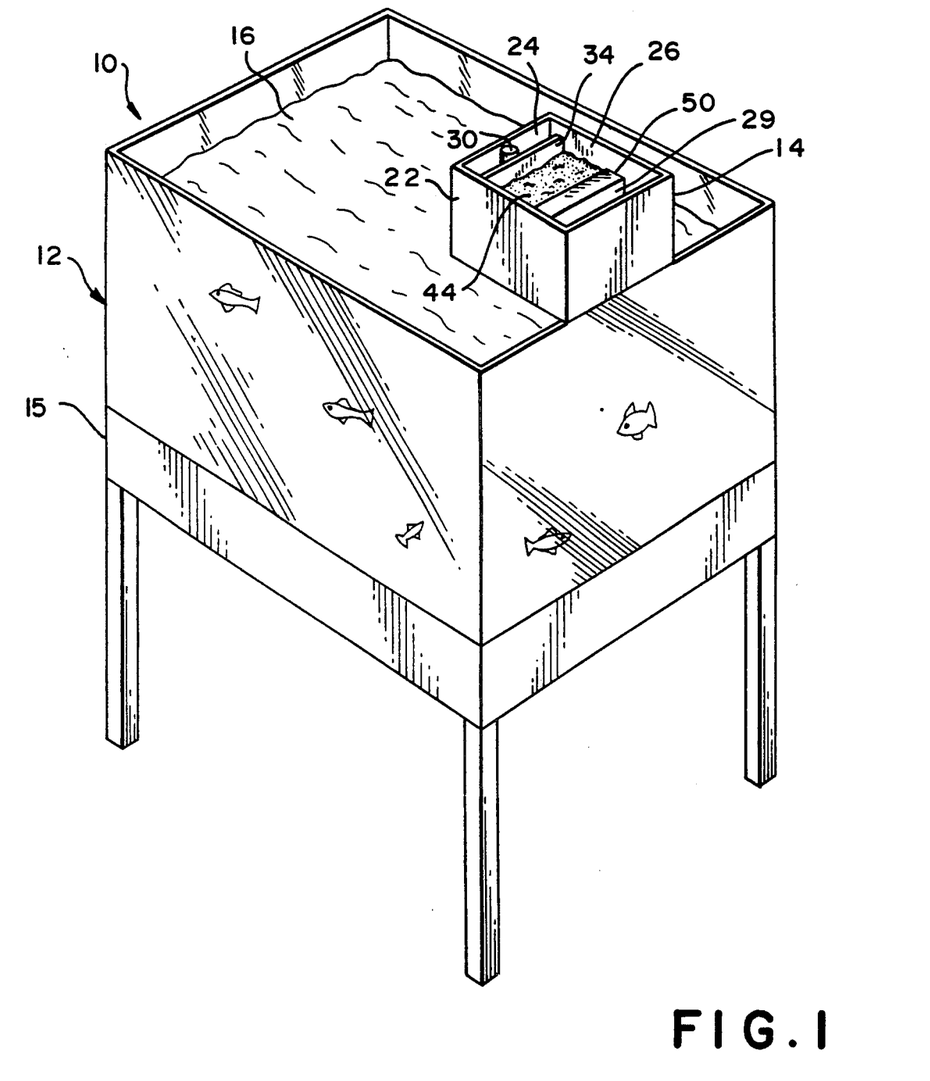
FIG. 1 is a perspective view of one embodiment of an aquarium system of the present invention.
Figure 2:
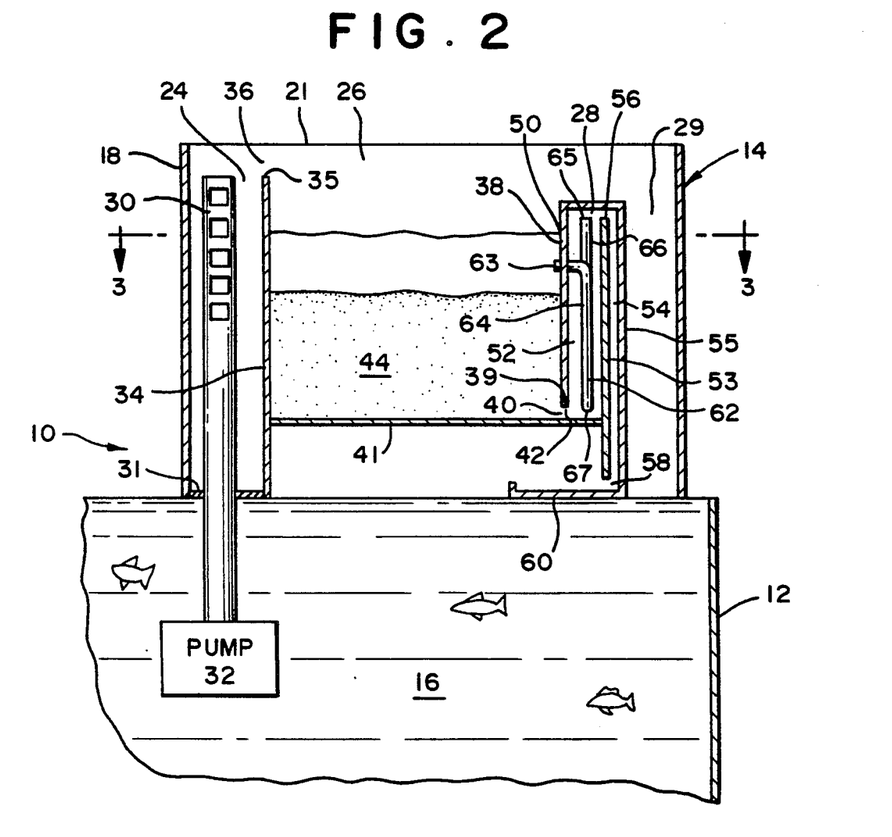
FIG. 2 is a cross-sectional view of the filter system of FIG. 1.
Figure 3:
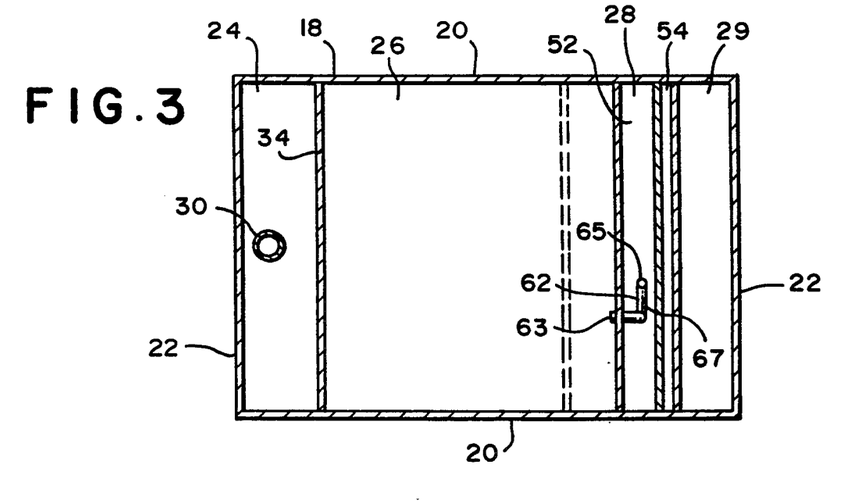
FIG. 3 is a top plan view of the filter system of FIG. 1 taken along lines 3—3 of FIG. 2.

Referring now to FIGS. 1, 2 and 3, the filter assembly 14 comprises a filter tank 18, which is a compartmentalized structure having side walls 20, an upper edge 21 and end walls 22. The filter tank 18 is preferably divided into three sections, the prefilter section 24, the filter media section 26 and the siphoning section 28. Additionally, there may be provided a fourth section, a spillover section 29, which provides a safety drainage feature for the filter assembly in the event the water level exceeds the capacity of a filter media section 26.

Prefilter

Although optional, the filter tank 18 preferably includes a prefilter section 24, in which the prefilter 30 is located. The prefilter 30 is designed to trap detritus and prevent it from entering and clogging the filter located in filter media section 26. The prefilter 30 is sealingly engaged in a lower floor 31 of the prefilter section 24. Prefilters are known to the art and comprise any of a number of filtering materials, such as synthetic flosses, gauzes, etc.

Situated within the water 16 of the aquarium tank 12 is a water pump 32 of conventional design and manufacture for the purpose of drawing water 16 from the aquarium tank 12 and pushing the water through the prefilter 30 and to the filter media section 26. In this manner, the water 16 is pumped through the prefilter 30 prior to reaching the filter media section 26.

Filter Media Section

The filter media section 26 is separated from the prefilter area 24 by means of a separating wall 34 having an upper edge 35. As illustrated in FIG. 2, the separating wall 34 does not completely separate the prefilter section 24 from the filter media section 26. As illustrated in FIG. 2, the upper edge 35 of the separating wall 34 is at a level substantially below the upper edge 21 of the side walls 20, illustrated on FIG. 3, thus providing an area of communication between the prefilter section 24 and the filter media section 26. It is within the scope of the present invention to provide other avenues of communication between the prefilter section 24 and the filter media section 26 such as, for example, communicating holes or passageways through the separating wall 34.

The filter media section 26 is bounded on the other side by a second separating wall 38 which separates the filter media section 26 from the siphon section 28. There is also a communicating channel 40, generally located between the lower edge 39 of the separating wall 38 and the floor 41 of the filter tank 18. If necessary, there is provided a semiporous filter media guard 42, for the purpose of allowing filtered aquarium water to enter the siphon section 28 while preventing the filter media particles from passing therethrough. The filter guard 42 keeps the filter media from being forced through the siphon mechanism by the presence of the flowing water.

Filter Media

The filter media section 26 is filled with a filter medium 44, which is alternately exposed to water and air during the repetitive drain and fill sequence of the filter system 14 of the present invention. The purpose of the filter medium 44 is to provide attachment sites of filtering bacteria which filter out impurities from the water. The purified water is then placed back into the aquarium tank.

There is a variety of filtering media which can be used in filter systems. All of the filter media are well known to the art for filtering out impurities from the aquarium water 16. Representative examples of filter material include calcarous material, such as dolomite, calcite, crushed coral or oyster shell. Additionally, ordinary aquarium gravel may be used, particularly for fresh water aquariums. Other examples include synthetic floss and sand.

It is preferred to use a biological filter in the present invention. A biological filter utilizes living aerobic-forms of bacteria growing on a host medium to decompose and detoxify biological waste products into harmless substances. The bacteria are naturally occurring organisms found in an aquatic ecosystem. The host medium cultures the bacteria, which allows the bacteria to attack and break down impurities. Generally, the host medium is a stationary filter product, such as gravel, floss or sand.

In biological filters, certain species of aerobic bacteria, which attach to the filter media and grow, convert potentially toxic by-products of animal or plant metabolism into non-harmful products. For example, ammonia and nitrite, which are potentially toxic by-products of fish metabolism, are converted into nitrate and nitrogen. These later chemicals, which even in higher concentrations are non-toxic to fish, can be used either by plants, as in the case of nitrate, or can escape through the surface of the water directly into the air, as in the case of nitrogen. The bacteria and other microorganisms growing on the filter media remove the organic matter by consuming it as a food product. As the bacteria grow and multiply, they convert the organic matter into body mass.

Due to the debris dislodging effect of the filter system 14 of the present invention, the filter allows the use of a filter media of a very small diameter, such as sand. Sand has a surface area much greater than that of any existing media. Thus, the filter capacity of the system will be enhanced by providing for increased attachment sites for the bacteria, resulting in an increase in the number of bacteria per unit area. Because of the increased number of bacteria per unit size, the overall size of the filter system may be reduced without decreasing the efficiency of the filter system.

The invention supports the efficient use of these desired bacteria in the filter medium and the purification of aquarium water by alternately flooding the stationary media with aquarium water and then draining the water to expose the media to air. The air circulates during the draining cycle and gives the aerobic bacteria the oxygen they need to live.

It was mentioned previously that a filter media guard 42 may be used to prevent the loss of the filter media 44 from the filter media section 26. Alternatively, the filter medium may be placed in a semiporous bag, which allows the aquarium water to freely flow through the filter medium while preventing the removal of the filter medium. This system works especially well with a filter medium such as sand, which would otherwise be carried away during the drain cycle.

Siphoning Section

Reference is now made to siphoning section 28 of the filter system 14. The siphoning section 28 comprises a siphon 50 for drawing water from the filter tank 18 to the aquarium tank 12 by siphoning action known to the art. The siphon 50 includes a water entrance portion 52 bordered by the separating wall 38, a siphon wall 53 and the two side walls 20. The channel 40 serves as the channel of communication between the filter section 26 and the entrance portion 52 and therefore may be considered the entrance portion opening. The siphon entrance portion 52 communicates with the siphon exit portion 54 at the mouth or opening 56 of the exit portion. The exit portion 54 is bordered by the siphon separating wall 53, a rear separating wall 55 and the two sidewalls 20, and terminates at exit end 58 opposite exit opening 56.

As illustrated in FIGS. 2 and 3, the siphon 50 comprises a rectangular fill portion, serving as the entrance portion 52, which communicates with a rectangular exit portion 54. In this manner, water rises in the entrance portion 52 until it overlaps and enters the opening 56 of exit portion 54 thus activating the siphoning action.

It is to be understood that the siphon apparatus illustrated in FIGS. 2 and 3 is but one form of a water-transfer system known to the art. Other systems which draw water from one section, such as the filter media section to another section, such as the aquarium tank, may be incorporated herein. For example, reference is made to FIGS. 8-10 for alternative embodiments of a filter system, which will be described hereinafter.

Located below the exit portion end 58 of the siphon 50 is a trough or ledge 60 bordered by a lip 61, the rear separating wall 55 and the sides 20. The trough 60 serves as a "splash guard" for water passing through the siphon 50. The trough 60 serves as a shallow pan which fills with water as water from the entrance portion 52 begins to overflow into the exit portion 54. The water in the trough 60 prevents air from entering the exit portion 58, and thereby aids in initiating the siphon action. As the water passes through the siphon exit portion 54 and connects with the trough 60, the trough 60 produces a swirling action in the water, similar to a wave action in a natural aqueous environment, which is important for a stable aquatic ecosystem.

The siphon must be of a sufficient size that the flow rate of water drawn from the filter tank 18 and delivered to the aquarium tank 12 exceeds the rate of input from the aquarium tank via the pump 32.

The advantage of tee siphon system illustrated in the figures is that it is a self-starting, self-stopping mechanism capable of filling and draining the filter tank 18 without the need for moving parts.

Siphon Break

Located in close association with the siphon system is a siphon break 62, which is preferably a U-shaped tube arranged with a first end 63 opening into the filter tank 18 at a level below the entrance opening 56 of the exit portion 54 and communicating with downwardly depending tubular conduit 64, and a second end 65 communicating with an upwardly depending tubular conduit 66. The downward conduit 64 is connected to the upward conduit 66 by means of a U-shaped connection joint 67 illustrated in FIG. 3. The upward conduit 66 terminates at the end portion 65 which opens into the entrance portion 52 of the siphon 50 at a level slightly below the opening 56 of the siphon exit portion 54.

The siphon break 62 is necessary for the efficient action of the siphoning system. If it is not used, the siphon 50 would continue to draw water until the water level in the filter tank 18 drops to the lower end of the entrance portion 52 of the siphon 50. At that point, both air and water would be drawn into the entrance portion 52. The entrance portion 52 would erratically "gulp" or "slurp" water and air, causing the efficiency or flow rate of the siphon system to be greatly reduced. Given the continuous input of water from the aquarium tank 12 by means of the aquarium pump 32, an unsteady siphon action could persist indefinitely and the water level would remain at the lower extremity of the siphon entrance portion 52. The siphon break 62 assures a positive termination of the siphon action.

By configuring the siphon break 62 so that the exposed end 63 of the siphon break 62 is above the water level at the time air begins to flow through the siphon break 62, the siphon break 62 ensures a positive break in the siphoning action. In this manner, the siphoning action of the siphon 50 cannot be reestablished without a complete refilling of the filter tank.

It is within the scope to provide a siphon break which could be a float-actuated air entry valve. The valve would allow air into the siphon in order to disable the siphoning action when the filter tank level has fallen to a specified level.

Referring now to FIGS. 4-7, the operation of the filter system illustrated in FIGS. 1-3 will now be explained. The important concept of the filter system 14 of the present invention is that the filter media 44 is alternately exposed to water and air during a repetitive fill and drain sequence. Throughout the filling and draining of the filter tank 18, aquarium water 16 enters the filter tank 18 at a continuous rate from the aquarium tank 12.

Figure 4:
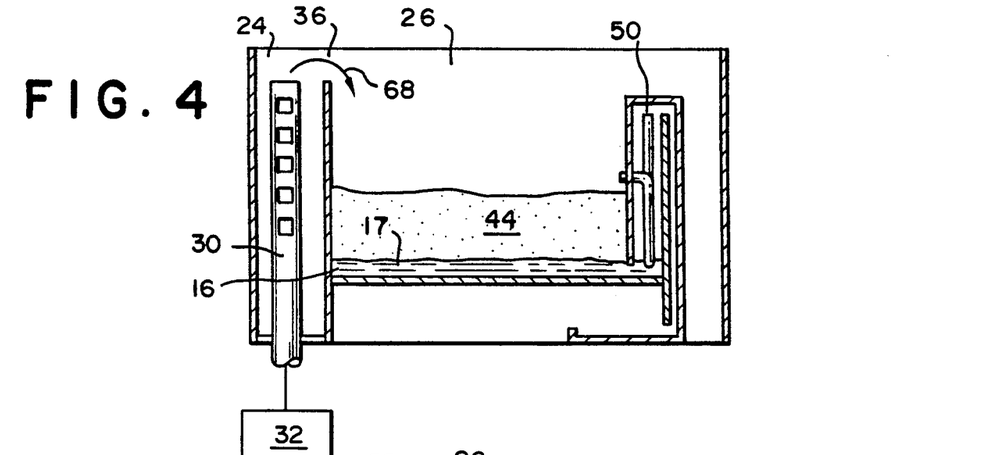
FIG. 4 is a cross-sectional view of the filter system of FIG. 1 at the beginning the filling cycle.

Referring now to FIG. 4, there is illustrated the filter tank 18, which is essentially devoid of aquarium water 16. The water level 17 is near the bottom of the filter media 44, indicating that the filter system is initiating the fill cycle. The filter media 44 is therefore exposed to air, which is necessary for the growth and maintenance of desirable bacteria and other microorganisms growing on the filter media 44. Because there is no water in the filter system, the siphon 50 is disabled. At this point, aquarium water begins to fill the filter media section 26 by means of the pump 32 pushing water from the aquarium tank 12 along flow arrow 68 through the prefilter 30, past the communicating channel 36 and into the filter media section 26. The aquarium water, which is full of impurities produced by the day-to-day metabolism of the fish and other aquatic life, filters through the filter media 44 as the filter media section 26 fills with aquarium water.

Figure 5:
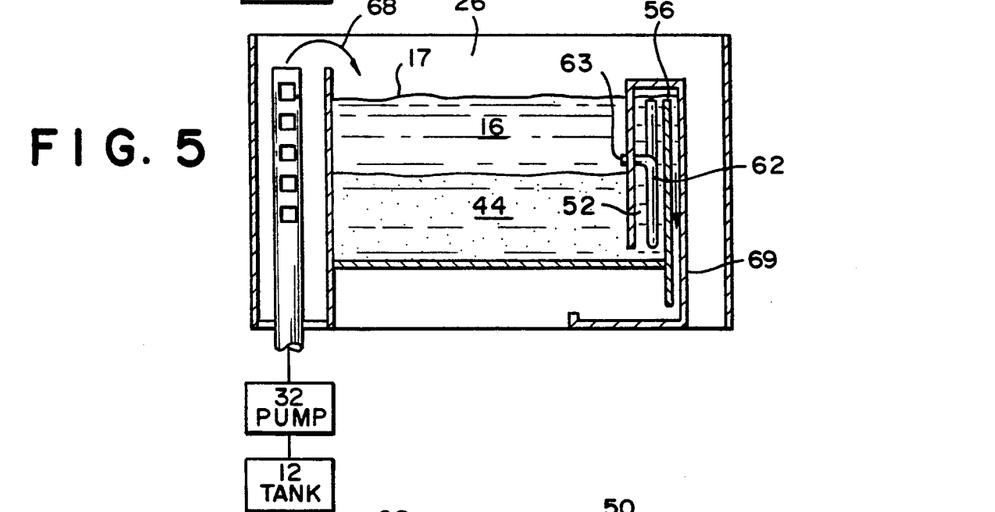
FIG. 5 is a cross-sectional view of the filter system of FIG. 1 with the filter tank full and the filter media flooded.

Referring now to FIG. 5, the aquarium water 16 from the aquarium tank 12 rises in the filter media section 26 and flows into the first end 63 of the siphon break 62 thus sealing the siphon break 62 and preventing the discharge of air through the break 62. As the water level 7 reaches and crests the exit portion opening 56 of the exit portion 54, water begins to flow down the exit portion 56 along flow arrow 69. No siphoning action has yet commenced because the exit portion 56 still contains air at this point. However, the rising level of the aquarium water in the entrance portion 52 and the exit portion 54 along the flow arrow 69 gradually purges any air from the exit portion 54 of the siphon.

Figure 6:
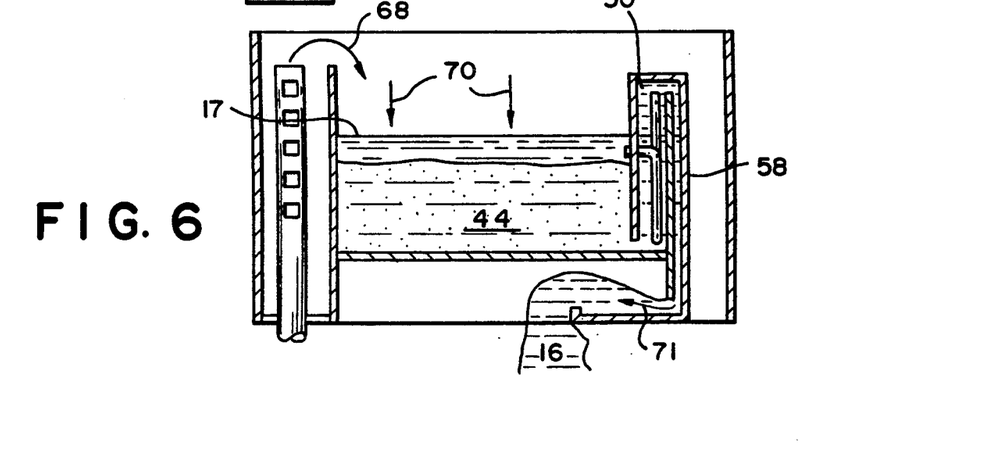
FIG. 6 is a cross-sectional view of the filter system of FIG. 1 showing the siphoning action in progress and the filter tank emptying.
Figure 7:
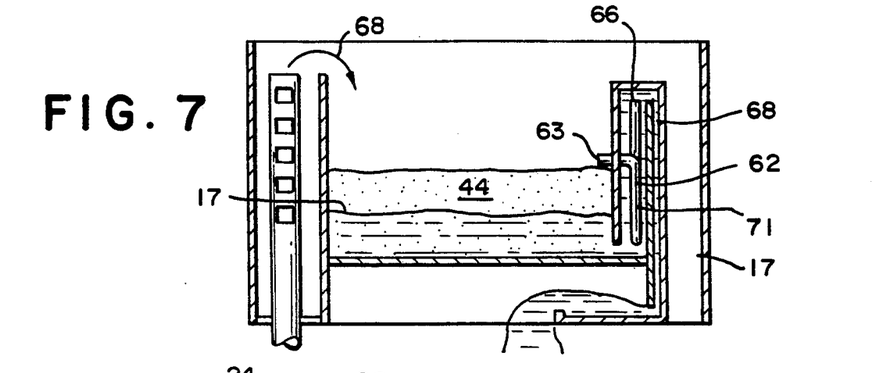
FIG. 7 is a cross-sectional view of the filter system of FIG. 1 showing the filter tank partially drained of aquarium water and the filter media partially exposed to air.

As the air is purged from the exit portion 54 of the siphon, the siphoning action engages, quickly lowering the water level 17 and causing the water 16 to drain back along flow arrows 70 through the bacteria covered filter medium 44 in an opposite direction, as illustrated in FIG. 6. The water flows down the exit portion 54 through the end 58 along flow arrow 71. This draining action causes a dislodging effect on the detrital particles, which is similar to the filtering action of sand on ocean beaches. The dislodging effect prevents a buildup and cementing of debris within the filtering media.

Because the siphon 50 is of a sufficient size that the flow rate from the filter tank 18 through the siphon 50 exceeds the rate of the flow rate of water entering the filter tank 18 along flow arrow 68, the water level 17 is gradually lowered.

When the water level in the filter tank 18 becomes lower than the open end 63 of the siphon break 62, air begins to enter the siphon break 62 at open end 63 and fills the downward conduit 64 thus gradually filling the siphon break 62.

Air does not enter the upward conduit 66 of the siphon break 62 until the water in the filter tank 18 is drained to a level below the connection joint 67 of the siphon break 62 as illustrated in FIG. 4. At that instant air is drawn, by a vacuum created by the siphoning action in the siphon 50, up the siphon break 62 causing a rapid positive termination of the siphoning action, as illustrated in FIG. 4. Water in the siphon entrance portion 52 then drains back to the filter tank 18 and water in the siphon exit portion 54 drains to the aquarium tank 12. With the siphoning action stopped, there is no flow of water from the filter tank 18, and the filter tank 18 then begins to fill again to repeat the process.

An advantage of the embodiment illustrated in the figures in which the filter system 14 is placed at a location above the aquarium tank 12 is that the draining of the filtered water through the exit portion 54 of the siphon 50 creates a wave-like action in the aquarium tank because of the rapid flow of water from the filter tank 14 into the aquarium 12. The wave action is beneficial to livestock and the physical processes within the aquarium tank 12 in that it provides delicate invertebrate inhabitants and fish with a more naturally simulated environment. Further, the wave action prevents unsightly sedimentation on the bottom of the tank due to the gentle and uniform water dispersion created by the wave action. The wave action also prevents planktonic life forms from congregating at the surface of the water in the aquarium tank due to the downward thrust of the incoming water from the filter system 14. In this manner, plankton is distributed throughout the tank and can serve as an easily accessible food source or tank populations. Further, the wave action prevents water stratification and surface proteins from accumulating.

Figure 8:
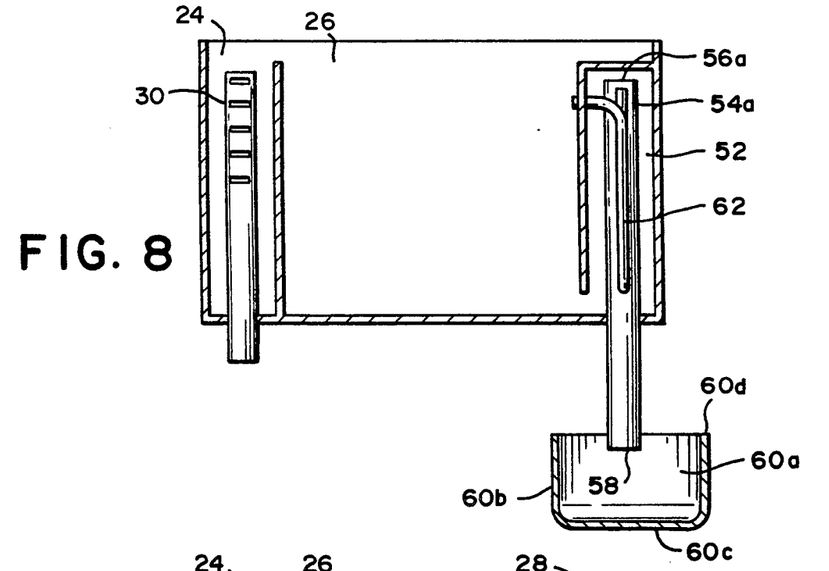
FIG. 8 is a cross-sectional view of an alternative embodiment of the filter system.
Figure 9:
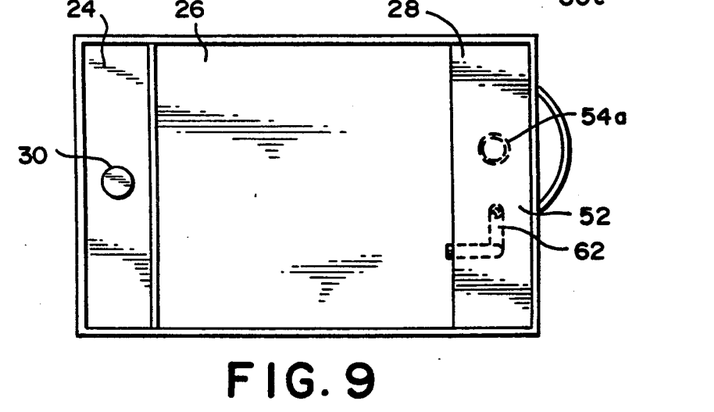
FIG. 9 is a top plan view of the embodiment of the filter system of FIG. 8.

Reference is now made to FIGS. 8 and 9 for another embodiment of the filter system of the present invention. The filter system illustrated in FIGS. 8 and 9 is similar to the system illustrated in FIGS. 1 and 2. The point of departure lies with the structure of the siphon 50. Instead of having a rectangularly-shaped exit portion 54, the siphon 50 illustrated in FIGS. 8 and 9 has a tubular conduit 54a, which may conveniently receive water from the entrance portion 52 as the water spills over the opening 56a of the conduit 54a. Additionally, the trough 60a, illustrated in FIGS. 8 and 9, is circular in appearance having side walls 60b and a floor 60c. With this embodiment, water flowing down the exit portion 54a will splash against the floor 60c and spill over the full circumference of the side walls 60b. Like the embodiment of FIGS. 1–7, the lower exit end 58 of the exit portion 54a is positioned below the upper lip 60d of the trough 60a. By filling the trough 60a to its rim with water, a fluid seal is created which prevents air from entering the exit portion 54a and thus promotes the establishment of the siphon action.

Figure 10:
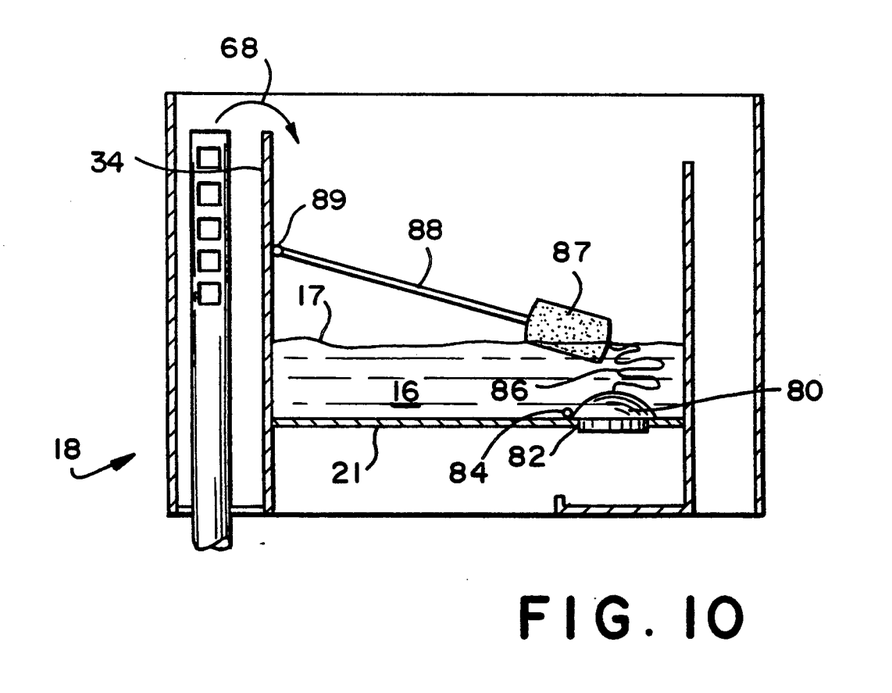
FIG. 10 is a cross-sectional view of the filter system of the present invention illustrating a second alternative embodiment of the water draining sequence.
Figure 11:
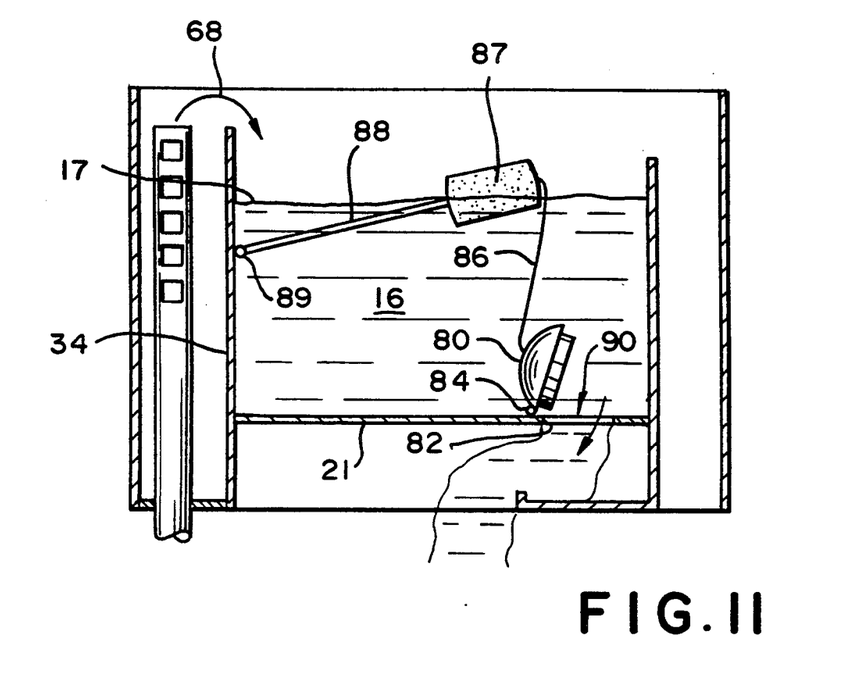
FIG. 11 is a cross-sectional view of the filter system of FIG. 10 illustrating the water draining sequence in operation.

Although preferable, it is not essential for the filter tank 18 to be drained by siphoning action when filled. Referring now to FIGS. 10 and 11, which for purposes of clarity omits reference to the filter medium 44, there is disclosed a drain valve 80, which may be of various designs known to the art. Suitable valves are formed of rubber or like material and are shaped like a plug for insertion into a drain hole 82 in the floor 21. The valve 80 is hingedly connected at 84 to the floor 21 of the filter tank 18 and opened, via a chain 86 or the like, by a mechanical device such as a buoyant float 87. The float 87 is attached to a rigid arm 88 which is hingedly attached at 89 to a wall such as the separating wall 34. The hinged attachment allows the float 87 to move upward or downward according to the height of the water level 17. When the water level in the filter tank 18 reaches a certain control level, as illustrated in FIG. 10, the drain valve 80 is forced open, allowing the water 16 to escape through the drain hole 82 along the direction of flow arrows 49.

Figure 12:
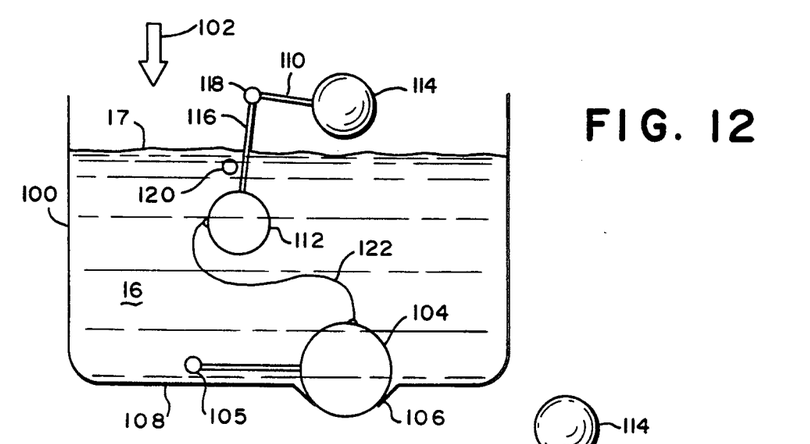
FIG. 12 is a cross-sectional view of a third alternative embodiment of the filter assembly of the present invention illustrating water in the filter chamber.
Figures 13, 14:
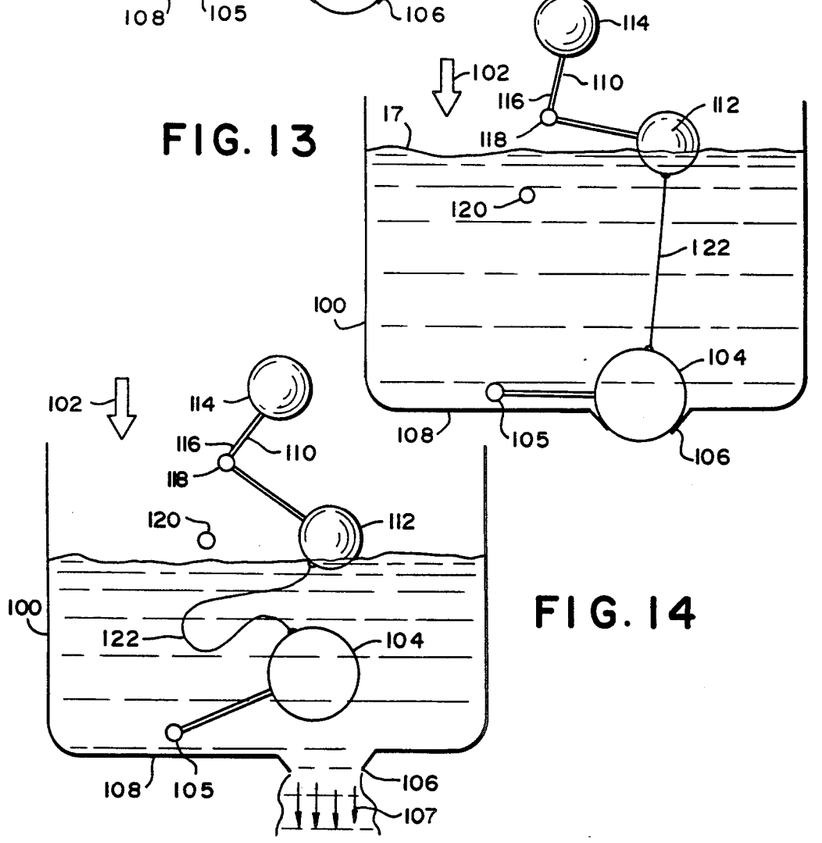
FIG. 13 is a cross-sectional view of the filter assembly of FIG. 12 illustrating a float being activated by the rising water level.
FIG. 14 is a cross-sectional view of the filter assembly of FIG. 12 illustrating the release of water from the filter tank.

Reference is now made to FIGS. 12-14 for a third alternative embodiment of the filter assembly 14 of the present invention.

Referring now to FIG. 12, the filter tank 100 is shown to be filling at a constant rate with water via flow arrow 102 from the aquarium. A sealing ball 104, attached to the filter tank 100 at pivot 105, closes a drain hole 106 in the floor 108 of the filter tank 100. An over-center release 110 is comprised of floats 112 and 114, and an angle arm 116 which connects the two floats. The arm 116 has a bearing at 118 which rotates on a pivot attached to the filter tank 100. The release 110 is prevented from rotating clockwise beyond the position shown by a mechanical stop 120 which is attached to the filter tank 100. A flexible cord 122 connects the release float 110 to the sealing ball 104. Although float 112 would like to rise, it cannot because of the stop 120 which prevents clockwise rotation of release 110. The release 110 does not rotate counterclockwise at this time because the center of float 112 is to the left of pivot 118. As the water level rises in the filter tank 100 however, it is apparent that the float 114 of the release will begin to be lifted by the water. As the water level lifts float 114, a counter clockwise movement will be created on the release float 110. The release 110 will rotate counter clockwise and float 112 will be lifted up through the water by its own buoyancy.

In FIG. 13, the over-center release 110 has been triggered by the rising water level. Counter clockwise rotation of the release float 110 has caused float 112 to rise, thus pulling taut cord 122 and tending to lift sealing ball 104 out of the drain hole 106. The release 110 is so designed that once counter-clockwise movement is initiated by float 114 and float 112 is lifted by its buoyancy, the buoyancy of the float 112 will immediately unseat the seating ball 104 from the drain hole 106.

In FIG. 14, the sealing ball 104 has been pulled from the drain hole 106 and is now floating, due to its own bouyancy in the water, and the pivot 105 in the filter tank 100. Because the water is leaving along flow arrows 107 at a faster rate than the constant input from the aquarium, the water level in the filter tank 100 is dropping. As the water level drops, the release float ball 112 drops and the over-center release float 110 rotates clockwise toward stop 120. The cord 122 is again slack.

Draining of the filter tank 100 will continue until such time as the buoyant sealing ball 104 drops into the drain hole 106 to stop the drain process. At that time, the filter will once again begin to fill. By this time, the release 110 will have rotated clockwise to the stop 120, placing the ball 112 to the left of the pivot 118 thus establishing the over-center positioning of the release float.

Reference is now made to FIGS. 15-18 for a fourth alternative embodiment of the filter assembly 14 of the present invention.

An objective of this design is to reduce the vertical height of the filter tank to an absolute minimum so that it can be conveniently located in a light hood above the aquarium. Siphon and mechanically activated fill and drain filters require more vertical height and are not easily located in a light hood of slim design. This concept is not limited in minimum vertical height. The filter tank is filled by drawing the water up into the filter tank to replace air removed by a siphon pump. The filter tank drains when air is admitted through an electrically operated air valve. The rapid influx of air permits rapid draining to create a wave motion in the aquarium below.

Figure 15:
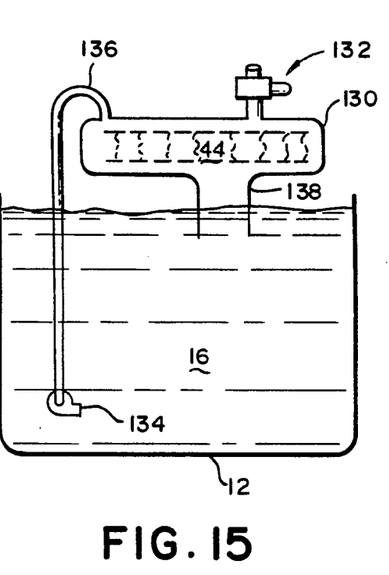
FIG. 15 is a cross-sectional view of a fourth alternative embodiment of the filter assembly of the present invention illustrating an empty filter tank.

Reference is now made to FIG. 15 which shows a filter tank 130 located above the aquarium tank 12. An electrically operated air valve 132 of known construction is in its normally closed position. A pump 134 is beginning to draw air from the filter tank 130 via the pump inlet tube 136. Air drawn from the filter tank 130 is discharged into the aquarium 12. The filter tank 130 has a large diameter inlet tube 138 which projects into the water in the aquarium 12.

Figure 16:
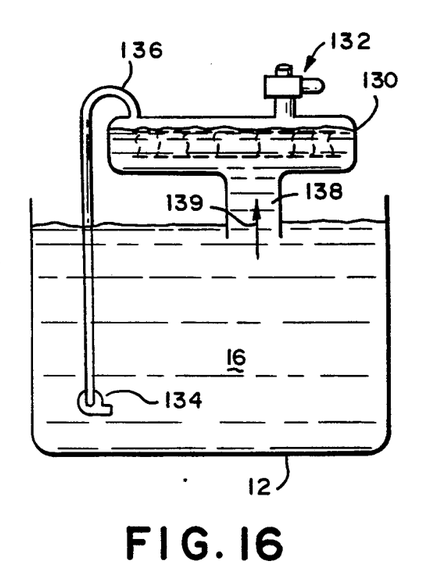
FIG. 16 is a cross-sectional view of the filter assembly of FIG. 15 illustrating the filter tank being filled with water.

In FIG. 16, the air continues to be drawn from the filter tank 130 by the pump 134 and the water from the aquarium 12 is drawn up into the filter tank 130 along flow arrow 139. The air valve 132 remains closed.

Figure 17:
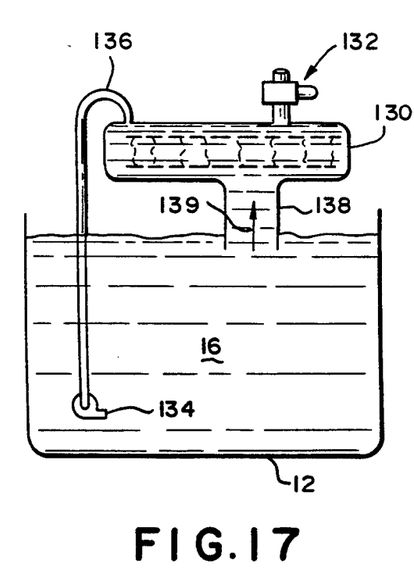
FIG. 17 is a cross-sectional view of the filter assembly of FIG. 15 illustrating a filled filter tank.

When all air is removed from the filter tank 130, as illustrated in FIG. 17, the pump inlet tube 136 is filled with water and the pump 134 now continues to draw water through the filter tank 130.

Figure 18:
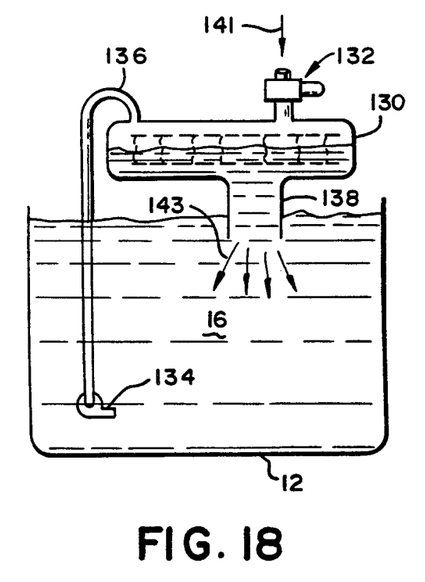
FIG. 18 is a cross-sectional view of the filter assembly of FIG. 15 illustrating the filter tank being emptied.

In FIG. 18, the air valve 132 is opened by timed electrical signal, and air is allowed into the filter tank 130 along flow arrow 141. The water in the filter tank 130 quickly flows back into the aquarium 12 along flow arrows 143 to create a wave motion in the aquarium 12. The air valve 132 is held open for a sufficient time to assure that all water has left the filter tank 130. The valve 132 is then allowed to return to its normal closed position and the process begins again as in FIG. 15.

It is to be noted that the air valve 132 functions only to let clean room air into the filter tank 130. It does not pass water or contaminated air and is therefore not subject to corrosion problems.

Figure 19:
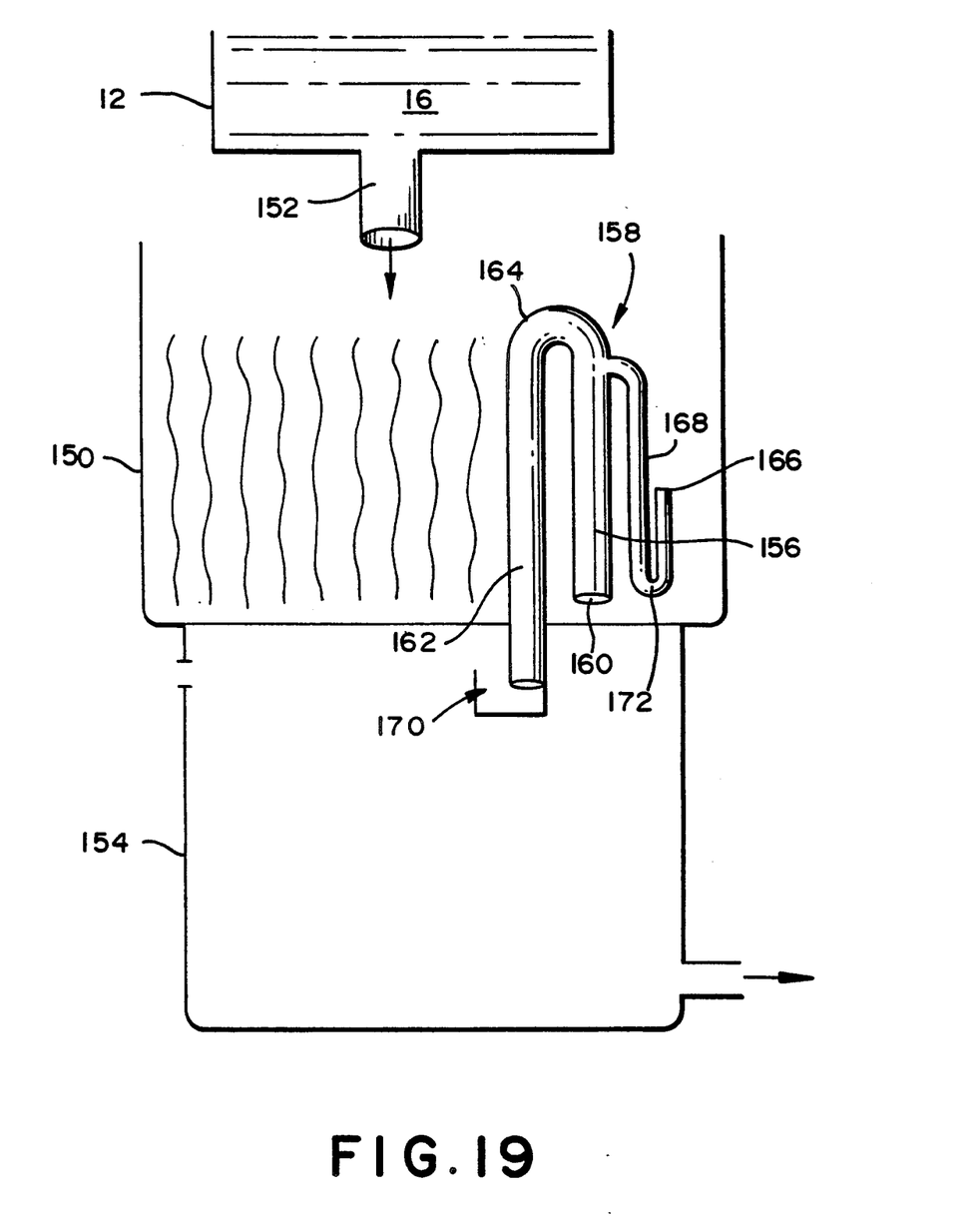
FIG. 19 is a cross-sectional view of a fifth alternative embodiment of the filter system of the present invention.

Reference is now made to FIG. 19 which discloses yet another embodiment of the filter system which is located below an aquarium tank 12. The aquarium water 16 from the aquarium tank 12 flows to the filter tank 150 by means of an inlet tube 152. The inlet rate of the water flow is essentially constant, and determined by the rate at which water is pumped back to the aquarium tank 12 from the storage tank 154. Incoming water from the aquarium tank 12 will gradually fill the filter tank 150 entering the entrance portion 156 of the siphon 158 at the communicating channel 160.

FIG. 19 also illustrates a variation of the siphon embodiments illustrated in FIG. 2. In FIG. 19, the siphon system 158 differs from the siphon system 50 illustrated in FIG. 2 in that the entrance portion 156 and the exit portion 162 are tubular conduits bridged by an inverted U-shaped communicating bridge 164. While the features of the siphon illustrated in FIG. 19 are different from that illustrated in FIG. 2, the siphoning action is essentially the same. As water gradually fills the filter tank 150 and enters the communicating channel 160 of the entrance portion 156, the water will also enter the open end 166 of the siphon break 168. When the water level in the filter tank 150 and the siphon 158 reaches the U-shaped bridge 164 of the siphon 158, some water begins to overflow from the entrance portion 156 to the exit portion 162 and into the storage tank 154 gradually filling the trough 170. When the trough 170 is filled, the water flowing through the exit portion 162 will spill into the storage tank 154. At this point, the entrance and exit portions 156, 162 of the siphon 158 function only as an overflow drain and not as a siphon because the exit portion 162 has not been purged of air. As water continues to flow through the siphon 158, air is gradually purged from the exit portion 162. Once the air is purged, siphon action is established through the siphon 158 and water is drawn rapidly from the filter tank 150 through the siphon 158.

The siphon 158 is of sufficient size of the flow rate of water drawn from the filter tank 150 and delivered to the storage tank 154 exceeds the rate of input of water from the aquarium tank 12. Consequently, the water level in the filter tank 150 is gradually lowered. The siphon 158 also draws water from the filter tank 150 through the siphon break 168.

When the water level in the filter tank 150 becomes lower than the open end 166 of the siphon break 168, air begins to enter the siphon break 168. Because of the U-shaped design of the siphon break, air gradually fills the siphon break 168 down to the connection joint 172, but does not enter the entrance portion 156 until the water in the filter tank is drained to the level of the connection joint 172 of the siphon break 168. At that instant, air is drawn through the siphon break 168 into the entrance portion 156 of the siphon 158. The influx of air into the siphon 158 results in a rapid, positive termination of the siphon action. Water in the entrance portion 156 drains back to the filter tank 150. Water in the exit portion 162 drains to the storage tank 154. With the siphoning action stopped, there is no flow of water from the filter tank 150 to the storage tank 154 and the filter tank 150 begins to fill again to repeat the process.

The filter system of the present invention, through its unique water discharge and distribution, as well as its ability to support large colonies of beneficial bacteria, results in a system of superior efficiency with numerous beneficial effects. This is like no other filter in that it utilizes all of the available surface area of the filter media all of the time. Additionally, the filter system of the present invention provides a natural environment for both invertebrate and vertebrate life forms.

It is understood that the invention is not confined to the particular construction and arrangement herein illustrated and described, but embraces such modified forms thereof as come within the scope of the following claims.

What is claimed is:

1. A method for continuously removing biological waste products from an aqueous medium in a filtering system located above an aquarium tank comprising a filter tank, a biological filtering medium adapted to culture bacterial useful in decomposing and detoxifying biological waste products into harmless substances and a siphon system, the method comprising the following steps in alternating sequence:
   a. passing an aqueous medium to be filtered into the filter tank, such that the aqueous medium fills the filter tank in such a manner to associate the aqueous medium with the filtering medium; and
   b. creating a wave-like action in the aquarium tank by draining the water rapidly from the filter tank, the draining water being initiated by the action of the siphon system.

2. A method according to claim 1 comprising prefiltering the aqueous medium prior to passing the aqueous medium into the filter tank, such that the prefiltering traps detritus particles and prevents them from entering the filter tank.

3. The method according to claim 1 comprising passing the aqueous medium through a filtering medium selected from the group consisting of calcarous material, aqueous gravel, synthetic floss and sand.

4. The method according to claim 1 wherein the filtering medium is sand.

5. The method according to claim 1 wherein the bacteria are aerobic bacteria.

6. The method according to claim 1 further comprising the following step:
   c) terminating the action of the siphon system by means of a siphon break, the siphon break being in association with the siphon system, wherein the siphon break draws air into the siphon, resulting in a rapid, positive termination of the siphon action.

7. In an aquarium tank comprising aquarium water, a method for filtering the aquarium water in a filtering system comprising a filter tank, a filtering medium and a siphon system, the method comprising introducing the aquarium water to the filtering system, such that the aquarium water associates with the filter medium, wherein the filter medium is a biological filter medium comprising beneficial bacterial useful in decomposing waste material in the aquarium water, wherein the aquarium water fills the filtering system to a level sufficient to purge air from the siphon resulting in the activation of the siphon, causing the aquarium water to drain rapidly through the filter medium in an opposite direction thereby creating wave-like action in the aquarium tank.

* * * * *